United States Patent Office 3,563,999
Patented Feb. 16, 1971

3,563,999
CERTAIN PERFLUOROALKYLENE OXY-ALKYLENE ESTERS OF PYRIDINIUM CARBOXYLATES
Louis G. Anello, Basking Ridge, and Richard F. Sweeney, Dover, N.J., assignors to Allied Chemical Corporation, New York, N.Y., a corporation of New York
No Drawing. Filed Nov. 1, 1968, Ser. No. 772,848
Int. Cl. C07d 31/34
U.S. Cl. 260—295
7 Claims

ABSTRACT OF THE DISCLOSURE

Quaternized haloalkyl esters of fluorocarbon alcohols having a polyfluoroisoalkoxyalkyl tail wherein an ether oxygen atom links a fluorinated carbon atom connected to two fluoroalkyl groups and at least one —$CF_2$— group. These compounds impart oil and water resistance to textiles.

---

This invention relates to novel polyfluoroalkoxyalkyl substituted textile treating agents. More particularly, this invention relates to novel quaternary ammonium salts of haloalkyl esters of polyfluoroisoalkoxyalkyl alcohols which impart oil repellency to textiles and fibers.

The novel compounds of this invention have the formula:

(1) 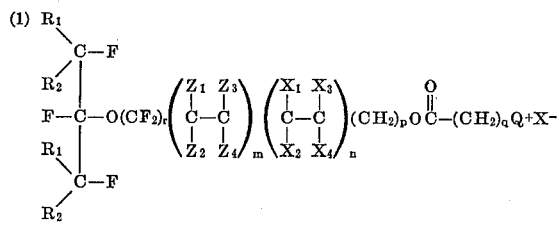

wherein $R_1$ and $R_2$ independently at each occurrence can be fluorine, chlorine, perfluoroalkyl or together can form a cyclic perfluoroalkylene group, with the proviso that both $R_1$ and $R_2$ cannot be chlorine; $Z_1$, $Z_2$, $Z_3$ and $Z_4$ are independently hydrogen, fluorine or chlorine, providing that no more than two of $Z_1$–$Z_4$ are chlorine; $X_1$, $X_2$, $X_3$ and $X_4$ are independently hydrogen, chlorine or fluorine providing that no more than one of $X_1$–$X_4$ is chlorine; $r$ is an integer of 1–2; $m$ and $n$ are integers from 0–75; the sum of $m$ and $n$ is 0–75; $p$ is 0 or 1, providing that when $p$ is 0, $n$ must be at least one and $X_3$ and $X_4$ must be hydrogen; $q$ is an integer from 1–4; Q represents a radical of a tertiary nitrogeneous base and X is a halogen. Preferably $m$ and $n$ are integers from 0–10.

The criticality in the structure of these compounds is in the polyfluoroisoalkoxyalkyl tail portion of the molecule wherein an ether oxygen atom links a fluorinated carbon atom attached to two fluoroalkyl groups and at least one —$CF_2$— group.

The compounds of the invention can be prepared in two steps by reacting a polyfluoroisoalkoxyalkyl alcohol having the formula:

(2) 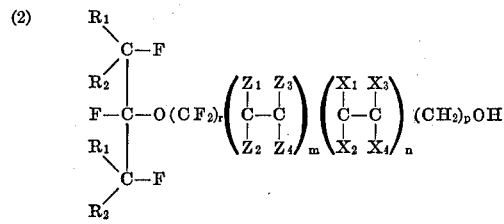

wherein $R_1$, $R_2$, $Z_1$–$Z_4$, $X_1$–$X_4$, $r$, $m$, $n$ and $p$ have the meanings given above with a haloalkyl acyl halide to form the intermediate haloalkyl ester of the alcohol. The ester can be further reacted with a tertiary amine base to form the quaternary ammonium salt.

The alcohols described in Formula 2 above can be prepared from their corresponding polyfluoroisoalkoxyalkyl iodides. These iodides and their preparation are disclosed in greater detail in copending U.S. application Ser. No. 633,359 filed Apr. 25, 1967, now Pat. No. 3,514,487. The pertinent details of that application are hereby incorporated by reference. These iodides are prepared by reacting polyfluoroisoalkoxytetrafluoroalkyl iodides of the formula:

(3) 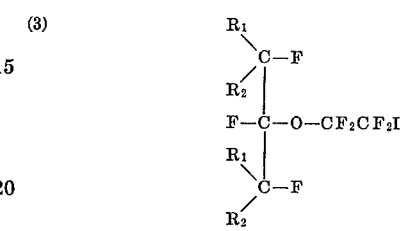

wherein $R_1$ and $R_2$ have the meanings given above, with telomerizable compounds having the formulas $Z_1Z_2C=CZ_3Z_4$ and/or $X_1X_2C=CX_3X_4$ wherein $Z_1$–$Z_4$ and $X_1$–$X_4$ have the meanings given above. Suitable telomerizable compounds include ethylene, tetrafluoroethylene, chlorodifluoroethylene, difluoroethylene and the like. The telomerization reaction can be initiated by heat, e.g. temperatures from about 100° C. to about 350° C., preferably from about 150° to 200° C., or by a free radical initiator, e.g. azobisisobutyronitrile, benzoyl peroxide and the like.

The polyfluoroisoalkoxytetrafluoroalkyl iodides can be prepared by reacting a corresponding halogenated ketone with an ionizable fluoride salt, e.g. CsF or KF, to form a fluorinated organic salt and reacting the organic salt with tetrafluoroethylene and iodine. Preparation of the polyfluoroisoalkoxytetrafluoroalkyl iodides is described in greater detail in copending U.S. applications of Litt et al. Ser. Nos. 492,276 filed Oct. 1, 1965, now Pat. No. 3,453,-333 and 513,574 filed Dec. 13, 1965, now Pat. No. 3,470,256. The pertinent subject matter of these applications is hereby incorporated by reference.

The following series of equations will serve to further illustrate the preparation of the polyfluoroisoalkoxyalkyl iodides, wherein $R_1$, $R_2$, $Z_1$–$Z_4$, $X_1$–$X_4$, $m$ and $n$ have the meanings given above

1.

2.

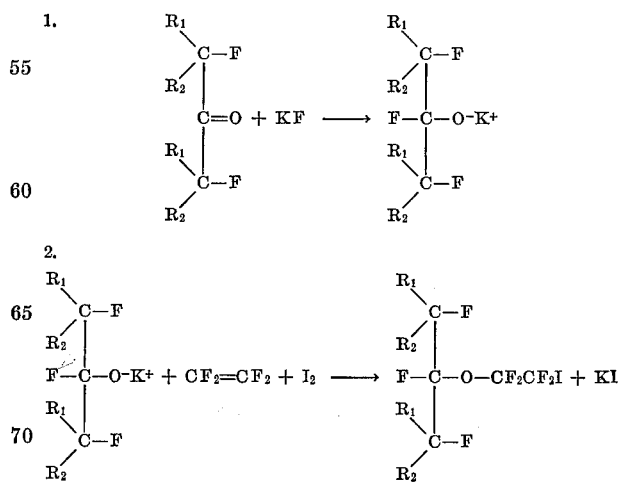

3.

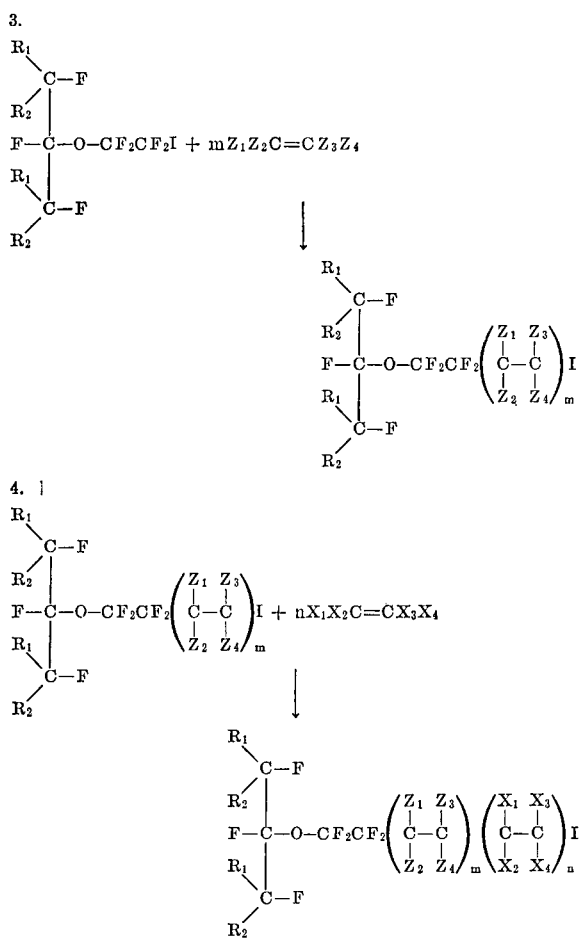

4.

It will be understood that when $m$ and/or $n=0$, the corresponding telomerization Equations 3 and/or 4 are omitted.

The alcohols as hereinbefore described can be prepared from the corresponding iodides in various ways. For example, alcohols having at least three terminal —CH$_2$— groups can be prepared by reacting a suitable iodide with an unsaturated alcohol having the desired number of carbon atoms to form the iodoalcohol and reducing the iodoalcohol with a mild reducing agent such as lithium aluminum hydride or zinc and alcohol.

The alcohols can also be prepared by reacting a suitable iodide as described above with sulfur trioxide to form the pyrosulfate, or with oleum to form the hydrosulfate and hydrolyzing the pyrosulfate or hydrosulfate to the alcohol with aqueous acid.

These and other telomer alcohols of Formula 2 are described in greater detail in copending U.S. application Ser. No. 721,089 filed Apr. 12, 1968. The pertinent subject matter of that application is hereby incorporated by reference.

A preferred class of alcohols within the scope of the general Formula 2 has the formula

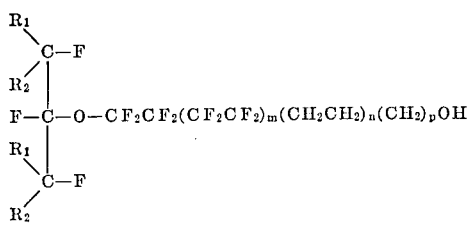

wherein $R_1$ and $R_2$ are independently fluorine or perfluoroalkyl groups of 1 to 2 carbon atoms, $m$ and $n$ are integers from 0–10, and $p$ is 0 or 1.

The alcohols described above are reacted with a suitable haloalkyl acyl halide to form the alkyl halide ester of the alcohol. Hydrogen halide is evolved during the course of this reaction. This reaction can be illustrated by the following equation:

5.

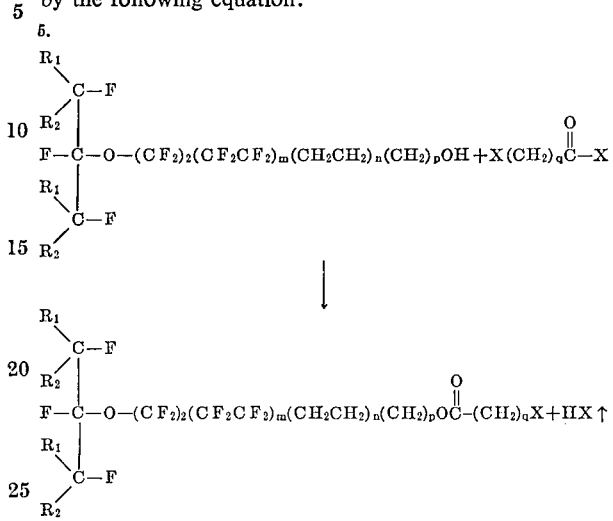

The temperature of this reaction is not critical and can vary over a wide range in the liquid phase. For convenience, the reaction is usually carried out at about room temperature initially, to prevent losses due to rapid evolution of the hydrogen halide. Conveniently, the reaction mixture is maintained at about 25–35° C., by cooling if necessary, and after the initial rapid evolution of hydrogen halide has ceased, the temperature can be increased up to about reflux, but preferably up to about 65–70° C. to insure complete reaction.

One mol of the haloalkyl acyl halide is required for complete reaction with one mol of the fluoroalcohol, but preferably a slight excess, on the order of from about 1.1 to about 1.25 mols of the haloalkyl acyl halide per mol of alcohol is employed to ensure complete utilization of the fluoroalcohol. A larger excess of the haloalkyl acyl halide can be employed if desired but no advantage is gained thereby.

Haloalkyl acyl halides suitable for use in the invention have the formula:

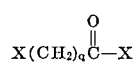

wherein $q$ is as defined hereinabove and X at each occurrence is a halogen independently selected from the group consisting of fluorine, chlorine, bromine and iodine. The preferred halogens are chlorine and bromine. Representative compounds include chloroacetyl chloride, bromoacetyl chloride, iodoacetyl chloride, 2-chloropropionyl chloride, 2-iodopropionyl bromide, 2-chloropropionyl bromide, 4-bromobutanoyl bromide, 4-iodobutanoyl chloride and the like. Other representative compounds will be known to one skilled in the art.

The ester product can be purified in conventional manner, as by distillation, as will be known to one skilled in the art. The higher molecular weight esters can be distilled under reduced pressure.

The quaternary ammonium salts of the above-described esters are prepared by reacting the esters obtained as above with a tertiary amine base in conventional manner. This reaction can be carried out in the presence or absence of a solvent or diluent, which can be an excess of the amine base employed. The reaction can be carried out at a temperature of from about 25° C. to about reflux, and preferably from about 70–80° C. until reaction is complete.

Tertiary amines suitable for use in the invention include trialkyl amines such as trimethylamine, triethylamine, tridodecylamine, tripentadecylamine, methyldiethylamine and the like; cycloaliphatic amines such as tricyclohexylamine; aralkyl amines such as benzyldimethylamine; aryl amines such as dimethylaniline; and heterocyclic amines such as pyridine, picoline, lutidine, quinoline and the like. Pyridine is particularly preferred for convenience and economy in the formation of textile treating agents.

The quaternary ammonium salts can be isolated in conventional manner, as by adding a nonsolvent to the reaction mixture, such as diethylether or dioxane, to precipitate the salt.

The quaternary ammonium salts of the invention are solids which are soluble in water. Such solutions foam readily on shaking and are useful as wetting, penetrating and softening agents. The salts of the invention are particularly useful as oil repellency agents for textiles. Solutions of the salts can be applied to textiles and fibers in conventional manner as by padding, dipping, spraying, brushing and the like. Excess solution is removed, as by squeezing or wringing, and heat is applied for a short time to decompose the quaternary ammonium salt and "set" the oil repellent onto the fabric. The quaternary ammonium salts of the invention can be applied to fabrics in amounts of from 0.001 to about 5.0% by weight of the fabric, to impart oil repellency thereto, but preferably amounts of from 0.1 to about 2% by weight are applied.

The invention will be illustrated by the following examples but it is to be understood that the invention is not meant to be limited to the details described therein. In the examples all parts are by weight unless otherwise noted.

EXAMPLE 1

4-heptafluoroisopropoxy-3,3,4,4-tetrafluorobutyl iodide (38 parts) having a boiling point of 85–87° C./100 mm. were charged to a vessel fitted with a stirrer, dropping funnel, thermometer and a condenser connected to a trap at —78° C. 28 parts of stabilized sulfur trioxide were added, maintaining the temperature at 35–40° C. Iodine was precipitated. The mixture was heated to 70° C. and held for two hours to complete formation of the pyrosulfate product. The mixture was cooled to room temperature and 100 parts by volume of 35% sulfuric acid were added slowly to hydrolyze the pyrosulfate to the alcohol. A small amount of sodium sulfite was added to remove any elemental iodine and the mixture heated for one hour at 105° C. Two layers formed on standing. The aqueous layer was washed with ether and the extract combined with the organic layer. The organic product was distilled by use of a spinning band column.

A 70% yield of 4-heptafluoroisopropoxy-3,3,4,4-tetrafluorobutanol was recovered having a boiling point of 84° C./59 mm.

Elemental analysis calculated for $C_7F_{11}H_5O_2$ (percent): C, 25.5; F, 63.3; H, 1.6. Found (percent): C, 24.9; F, 62.6; H, 1.6.

Forty-eight parts of 4-heptafluoroisopropoxy-3,3,4,4-tetrafluorobutanol as prepared above and 21 parts of chloroacetyl chloride were charged to a vessel. The temperature gradually rose to 35° C. and HCl was evolved. The mixture was heated at 50° C. for 5 hours until evolution of HCl had ceased. The product was distilled.

A 90% yield (54.5 parts) of 4-heptafluoroisopropoxy-3,3,4,4-tetrafluorobutanol, chloroacetate of the formula

were recovered having a boiling point of 75–76° C./4 mm.

The structure was confirmed by infrared analysis which showed a carbonyl absorption at 5.7 microns.

Elemental analysis calculated for $C_9F_{11}H_6ClO_3$ (percent): C, 26.6; F, 51.2; H, 1.5; Cl, 8.7. Found (percent): C, 26.3; F, 50.9; H, 1.4; Cl, 8.5.

A mixture of 21 parts of the chloroacetate and 7.9 parts of pyridine were heated to 70° C. for five hours while stirring. The crude product was stirred with about 70 parts of diethyl ether, filtered and dried.

4-heptafluoroisopropoxy - 3,3,4,4 - tetrafluorobutanol, chloropyridinium acetate (19.4 parts) having the structural formula

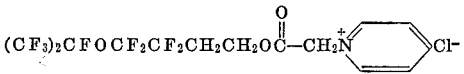

were recovered as a light tan solid having a melting point of 108–110° C.

Elemental analysis calculated for $C_{14}F_{11}H_{11}ClNO_3$ (percent): C, 34.6; F, 43.0; H, 2.2; Cl, 7.3. Found (percent): C, 35.1; F, 43.5; H, 2.3; Cl, 7.5.

EXAMPLE 2

4 - heptafluoroisopropoxy - 3,3,4,4 - tetrafluorobutanol (49 parts) prepared as in Example 1, and 23.5 parts of chloropropionyl chloride were reacted following the procedure of Example 1. The product was distilled.

A 90% yield (57 parts) of 4-heptafluoroisopropoxy-3,3,4,4-tetrafluorobutanol-2-chloropropionate of the formula

were recovered having a boiling point of 83–84° C./4 mm. The structure was confirmed by infrared analysis.

Elemental analysis calculated for $C_{10}F_{11}H_8ClO_3$ (percent): C, 28.4; F, 49.2; H, 1.9; Cl, 8.4. Found (percent): C, 27.8; F, 50.2; H, 2.0; Cl, 8.2.

23.5 parts of the chloropropionate were reacted with 7.9 parts of pyridine. The product was precipitated with diethyl ether, filtered and dried.

10 parts of 4-heptafluoroisopropoxy - 3,3,4,4 - tetrafluorobutanol, 2-chloropyridinium propionate having the structural formula

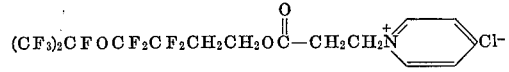

were recovered as a soft, tan solid.

Elemental analysis calculated for $C_{15}F_{11}H_{13}ClNO_3$ (percent): C, 36.0; F, 41.8; H, 2.2; Cl, 7.1. Found (percent): C, 37.0; F, 42.2; H, 2.7; Cl, 7.3.

EXAMPLE 3

One thousand five parts of 20% oleum were charged to a vessel and 615 parts of 8-heptafluoroisopropoxy-3,3,4,4,5,5,6,6,7,7,8,8 - dodecafluoro-1-octyl iodide were added over a period of 1.5 hours while maintaining the temperature at about 95–100° C. The mixture was stirred at 95–100° C. an additional 1.5 hours. 2200 parts of water containing 145 parts of sodium thiosulfate were added to effect hydrolysis and remove iodine. The mixture was heated at 100° C. for one hour. After cooling, the mixture was taken up in ether, dried, and the ether flashed off. The oily residue was distilled.

A 72.5% yield of 8-heptafluoroisopropoxy-3,3,4,4,5,5, 6,6,7,7,8,8-dodecafluoro-1-octanol was recovered having a boiling point of 80–82° C./4 mm.

Elemental analysis calculated for $C_{11}F_{19}H_5O_2$ (percent): C, 24.9; F, 68.1; H, 0.9. Found (percent): C, 25.0; F, 68.5; H, 1.1.

The alcohol as prepared above (25 parts) was reacted with 8 parts of acetyl chloride as in Example 1. The product was distilled.

A 95% yield (27 parts) of 8-heptafluoroisopropoxy-3,3,4,4,5,5,6,6,7,7,8,8 - dodecafluorooctanol, chloroacetate were obtained having a boiling point of 119–122° C./3 mm. The structure

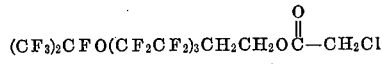

was confirmed by infrared analysis.

Elemental analysis calculated for $C_{13}F_{19}H_6ClO_3$ (percent): C, 25.7; F, 59.5; H, 1.0; Cl, 5.9. Found (percent): C, 26.1; F, 58.8; H, 1.1; Cl, 6.0.

The chloroacetate (14.2 parts) was prepared as above and reacted with 5 parts of pyridine following the procedure of Example 1.

The product was 8-heptafluoroisopropoxy-3,3,4,4,5,5,6,6,7,7,8,8-dodecafluorooctanol, chloropyridinium acetate having the structure

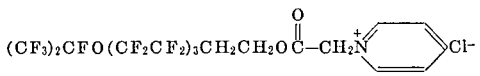

recovered as a light tan solid having a melting point of 116–119° C.

Elemental analysis calculated for $C_{18}F_{19}H_{11}ClNO_3$ (percent): C, 31.6; F, 52.7; H, 1.6; Cl, 5.2. Found (percent): C, 32.2; F, 53,3; H, 1.8; Cl, 5.0.

EXAMPLE 4

Two hundred ten parts of 4-heptafluoroisopropoxy-perfluorobutyl iodide, 90 parts of undecylenic alcohol and 1 part of $\alpha,\alpha'$-azobisisobutyronitrile catalyst were admixed and heated at 70–75° C. for 12 hours. The mixture was distilled.

A 96.0% yield (228 parts) of 15-heptafluoroisopropoxy-12,12,13,13,14,14,15,15-octafluoro-10-iodopentadecanol having a boiling point greater than 100° C. at 2 mm. were recovered.

Elemental analysis calculated for $C_{18}F_{15}H_{22}IO_2$ (percent): C, 31.7; F, 41.8; H, 3.2; I, 18.6. Found (percent): C, 31.5; F, 41.0; H, 3.2; I, 17.8.

The iodoalcohol as prepared above was dissolved in 300 parts of anhydrous diethyl ether and added slowly to a vessel containing 500 parts by volume of anhydrous diethyl ether and 32 parts of lithium aluminum hydride. The mixture was refluxed overnight. Ethyl acetate and sulfuric acid were added to decompose excess lithium aluminum hydride. The mixture separated into two phases. The organic layer was separated, dried and the ether distilled off. The oily residue was fractionally distilled.

An 81% yield of 15-heptafluoroisopropoxy-12,12,13,13,14,14,15,15-octafluoropentadecanol having a boiling point of 110° C./0.5 mm. was recovered.

Elemental analysis calculated for $C_{18}F_{15}H_{23}O_2$ (percent): C, 38.8; F, 51.3; H, 4.1. Found (percent): C, 38.5; F, 51.8; H, 4.8.

Ten parts of 15-heptafluoroisopropoxy-12,12,13,13,14,14,15,15-octafluoropentadecanol were reacted with 5 parts of acetyl chloride following the procedure of Example 1.

A 91% yield (11 parts) of 15-heptafluoroisopropoxy-12,12,13,13,14,14,15,15 - octafluoropentadecanol, chloroacetate of the formula $$(CF_3)_2CFO(CF_2CF_2)_2(CH_2CH_2)_5CH_2O\overset{O}{\overset{\|}{C}}-CH_2Cl$$

were recovered. The structure was confirmed by infrared analysis.

Element analysis calculated for $C_{20}F_{15}H_{24}ClO_3$ (percent): C, 37.9; F, 45.1; H, 3.8; Cl, 5.6. Found (percent): C, 38.0; F, 54.8; H, 3.5; Cl, 5.4.

Nine parts of the corresponding chloropyridinium acetate were obtained by reaction of 11 parts of the chloroacetate and 6 parts of pyridine.

15 - heptafluoroisopropoxy - 12,12,13,13,14,14,15,15-octafluoropentadecanol, chloropyridinium acetate having the structure

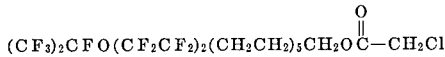

was obtained as a light tan solid having a melting point of 140–143° C.

Elemental analysis calculated for $C_{25}F_{15}H_{29}ClNO_3$ (percent): C, 42.2; F, 40.1; H, 4.1; Cl, 5.0. Found (percent): C, 41.8; F, 40.2; H, 4.8; Cl, 5.2.

The quaternary ammonium compounds of the invention are useful as treating agents to impart oil and stain resistance to fabrics.

The procedure employed in determining the oil repellency ratings is described in the Textile Research Journal, on pp. 323–324 of the April 1962 edition. Drops of mixtures of mineral oil ("Nujol") and n-heptane are gently placed on the treated fabrics. After 3 minutes the wetting and penetration of the fabric is observed visually. The number corresponding to the mixture containing the highest percentage of heptane which does not penetrate or wet the fabric is taken as the oil repellency rating of the treated fabric. A rating of about 90 or higher is considered excellent.

EXAMPLE 5

Samples of cotton cloth were padded with solutions (aqueous or alcoholic) of various concentrations of compounds of the invention squeezed to remove excess solution (100% wet pick-up) and dried at about 160° C. for 4 minutes. The test data is summarized below:

| Quaternary Compound | Solvent | Concentration, percent | Oil repellency rating |
|---|---|---|---|
| Example: | | | |
| 1 | Isopropanol | 2.0 | 110 |
| 2 | do | 2.0 | 90–100 |
| 3 | do | 1.0 | 110–120 |
| 3 | Water | 1.0 | 110 |
| 4 | Isopropanol | 1.0 | 80 |
| 4 | Water | 1.0 | 100 |

EXAMPLES 6–10

Quaternary ammonium salts of haloalkyl esters of additional polyfluoroisoalkoxyalkyl alcohols are prepared according to the procedures described above and are effective oil repellency agents for textiles. The structural formulas of illustrative compounds are set forth below.

EXAMPLE 6

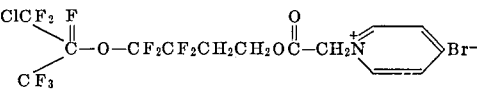

EXAMPLE 7

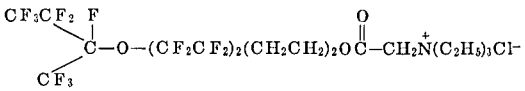

EXAMPLE 8

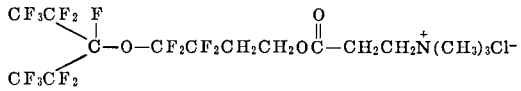

EXAMPLE 9

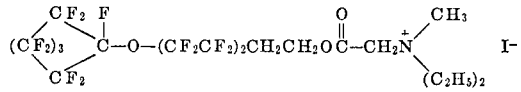

EXAMPLE 10

It will be apparent that numerous modifications and variations can be effected without departing from the novel concepts of the present invention, and the illustrative details disclosed are not to be construed as imposing undue limitations on the invention.

We claim:
1. A compound of the formula

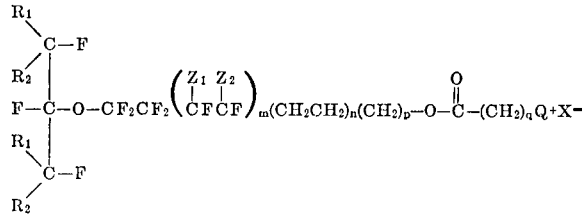

wherein
- $R_1$ and $R_2$ are independently at each occurrence, fluoro, chloro, perfluoroalkyl of 1 to 2 carbon atoms and together can form a cyclic perfluoro alkylene group of 4 to 6 carbon atoms with a proviso that $R_1$ and $R_2$ cannot both be chlorine;
- $Z_1$ and $Z_2$ may be fluorine or chlorine with a proviso that only one of $Z_1$ and $Z_2$ may be chlorine;
- $m$ and $n$ are integers from 0 to 10;
- $p$ is 0 or 1, provided that when $p$ is 0, $n$ must be at least 1;
- $q$ is an integer from 1 to 4;
- Q is selected from the group consisting of pyridinium, picolinium and lutidinium radicals; and
- X is a halogen atom.

2. A compound according to claim 1 in which Q is the pyridinium radical.

3. A compound according to claim 1 wherein $Q^+X^-$ is:

4. A compound of the formula:

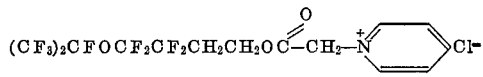

5. A compound of the formula:

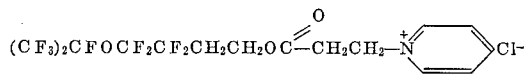

6. A compound of the formula:

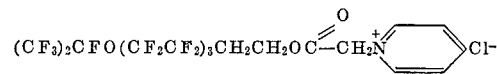

7. A compound of the formula:

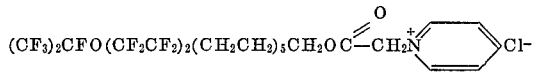

References Cited

UNITED STATES PATENTS 3,352,625    11/1967    Gagliardi et al. _____ 8—116.2

ALAN L. ROTMAN, Primary Examiner

U.S. Cl. X.R.

8—115.5, 115.7, 116.2, 120; 260—482, 487